(12) United States Patent (10) Patent No.: US 7,982,609 B2
Padmanabhan et al. (45) Date of Patent: Jul. 19, 2011

(54) RFID-BASED ENTERPRISE INTELLIGENCE

(75) Inventors: Venkata Padmanabhan, Bangalore (IN); Lenin Ravindranath Sivalingam, Cambridge, MA (US); Piyush Agrawal, Stanford, CA (US)

(73) Assignee: Microsoft Corporation, Redmond, WA (US)

( * ) Notice: Subject to any disclaimer, the term of this patent is extended or adjusted under 35 U.S.C. 154(b) by 418 days.

(21) Appl. No.: 12/141,096

(22) Filed: Jun. 18, 2008

(65) Prior Publication Data

US 2009/0315678 A1 Dec. 24, 2009

(51) Int. Cl.
*G08B 13/14* (2006.01)
(52) U.S. Cl. .............. 340/572.1; 340/572.4; 340/572.7; 340/572.8; 340/539.13; 340/10.1; 235/385; 235/492; 709/238; 709/224
(58) Field of Classification Search .............. 340/572.1, 340/572.4, 572.7, 572.8, 539.13, 10.1; 235/385, 235/492; 709/238, 224
See application file for complete search history.

(56) References Cited

U.S. PATENT DOCUMENTS

| | | | |
|---|---|---|---|
| 6,659,344 B2 | 12/2003 | Otto et al. | |
| 6,925,471 B2 | 8/2005 | Bodin et al. | |
| 7,194,422 B1 * | 3/2007 | St. John Killick | 705/14.38 |
| 7,195,159 B2 | 3/2007 | Sloan et al. | |
| 7,199,715 B2 * | 4/2007 | Fields et al. | 340/572.1 |
| 2003/0038172 A1 * | 2/2003 | Bodin et al. | 235/100 |
| 2006/0066449 A1 | 3/2006 | Johnson | |
| 2007/0024463 A1 | 2/2007 | Hall et al. | |
| 2007/0139181 A1 | 6/2007 | Eren et al. | |
| 2007/0205860 A1 | 9/2007 | Jones et al. | |
| 2008/0024278 A1 | 1/2008 | Volpi et al. | |

OTHER PUBLICATIONS

Chawathe, et al., "Managing RFID Data", Proceedings of the 30th VLDB Conference, Date: 2004, pp. 1189-1195, VLDB Endowment.
Patterson, et al., "Contextual Computer Support for Human Activity", in AAAI Spring Symposium: Interaction, 2004. 3 Pages.
Philipose, et al. "Fast, Detailed Inference of Diverse Daily Human Activities", UIST '04—Adjunct Proceedings of the 17th Annual ACM Symposium on User Interface Software and Technology, 2004. 2 Pages.
"EPCglobal", p. 1, (Retrieved Feb. 4, 2008) http://www.epcglobalinc.org.
"Electromagnetic Fields and Public Health:Health Effects of Radiofrequency Fields", Based on a Fact Sheet of Environmental Health Criteria 137 Electromagnetic Fields (300 Hz to 300 GHz), WHO, Geneva, 1993, and the report of the Scientific Review under the auspices of the International EMF Project of the WHO, Munich, Germany, Nov. 1996. 4 Pages.

(Continued)

*Primary Examiner* — Tai T Nguyen
(74) *Attorney, Agent, or Firm* — Lyon & Harr, LLP; Mark A. Watson

(57) ABSTRACT

An "RFID-Based Inference Platform" provides various techniques for using RFID tags in combination with other enterprise sensors to track users and objects, infer their interactions, and provide these inferences for enabling further applications. Specifically, observations are collected from combinations of RFID tag reads and other enterprise sensors including electronic calendars, user presence identifiers, cardkey access logs, computer logins, etc. Given sufficient observations, the RFID-Based Inference Platform automatically differentiates between tags associated with or affixed to people and tags affixed to objects. The RFID-Based Inference Platform then infers additional information including identities of people, ownership of specific objects, the nature of different "zones" in a workspace (e.g., private office versus conference room). These inferences are then used to enable various applications including object tracking, automated object ownership determinations, automated object cataloging, automated misplaced object alerts, video annotations, automated conference room scheduling, semi-automated object image catalogs, object interaction query systems, etc.

14 Claims, 5 Drawing Sheets

OTHER PUBLICATIONS

"Speedway Reader—Reliable Data Comes Standard", UHF GEN 2 RFID, Copyright 2007, Impinj, Inc. 6 Pages.
Schuman, "Intel's RFID Move to Slash Reader Prices", Mar. 6, 2007. Article Available on Webpage (Retrieved Feb. 4, 2008): http://www.eweek.com/c/a/Retail/Intels-RFID-Move-To-Slash-Reader-Prices/.
"Is RFID Safe at the Work Place?" RFID4SME Report (Project Part-Financed by the European Union), Dec. 12, 2007. 9 Pages.
"BizTalk RFID", Copyright 2008 Microsoft Corporation. Webpage (Retrieved Feb. 4, 2008) Available at: http://www.microsoft.com/biztalk/technologies/rfid/default.mspx.
"RFID 301: A Detailed Look at Using RFID in Your Library", 3M Corporation, Webpage (Retrieved Feb. 4, 2008) Available at: http://solutions.3m.com/wps/portal/3M/en_US/library/home/resources/case_studies/rfid_301/.
"SmartCode Corp. Announces the World's First 5-cent RFID", May 5, 2006, Article Available on Webpage (Retrieved Feb. 4, 2008): http://www.rfidsolutionsonline.com/Content/news/article.asp?Bucket=Article&DocID=9614cdc1-65ca-4299-82f9-01e155a31e78&VNETCOOKIE=NO.
"The History of RFID Technology", RFID Journal—RFID (Radio Frequency Identification) Technology News & Features. Webpage (Retrieved Feb. 4, 2008) Available at : http://www.rfidjournal.com/article/view/1338/1/129.
Srivastava, "ITU Internet Reports 2005: The Internet of Things", Executive Summary, Nov. 2005, 28 Pages.
Bahl, et al., "Radar: An In-Building RF-based User Location and Tracking System", Proceedings of IEEE Infocom 2000, Tel-Aviv, Israel, Mar. 2000, 10 Pages.
Chaudhry, "RFID Technical Tutorial and Threat Modeling Version 1.0", Department of Computer Science and Engineering, University of Arkansas. Dec. 8, 2005, pp. 1-39.
Want, et al. "The Active Badge Location System", ACM Transactions on Information Systems (TOIS) vol. 10, Issue 1 (Jan. 1992). pp. 91-102.
Fishkin, et al. "I Sense a Disturbance in the Force: Unobtrusive Detection of Interactions with RFID-tagged Objects", Intel Research IRS-TR-04-013, Copyright 2004, Intel Corporation. 17 Pages.
Geist, "Computer and E-Mail Workplace Surveillance in Canada: The Shift from Reasonable Expectation of Privacy to Reasonable Surveillance", Prepared for Canadian Judicial Council. (2003), 59 Pages.
Hahnel, et al., "Mapping and Localization with RFID Technology", Proceedings ICRA '04, 2004 IEEE International Conference on Robotics and Automation, vol. 1, pp. 1015-1020. Apr. 26, 2004-May 1, 2004.
Juels, "RFID Security and Privacy: A Research Survey", IEEE Journal on Selected Areas in Communications, vol. 24, Issue 2, Feb. 2006. pp. 381-394.
Liu, et al. "Ferret: RFID Localization for Pervasive Multimedia", UbiComp 2006: Ubiquitous Computing, vol. 4206/2006. Springer Berlin / Heidelberg. 19 Pages.
Philipose, et al. "Inferring Activities from Interactions with Objects", pp. 10-17, Pervasive Computing, Published by the IEEE CS and IEEE ComSoc. Copyright 2004 IEEE.
Rahmati, et al. "Reliability Techniques for RFID-Based Object Tracking Applications", 37th Annual IEEE/IFIP International Conference on Dependable Systems and Networks (DSN'07), 2007. 6 Pages.
Ramakrishnan, et al. "Performance Benchmarks for Passive UHF RFID Tags", Proceedings of the 13th GI/ITG Conference on Measurement, Modeling, and Evaluation of Computer and Communication Systems. Nurenberg, Germany, Mar. 27-29, 2006. pp. 137-154.
Smith, et al., "RFID-based Techniques for Human-Activity Detection", Communications of the ACM, Sep. 2005. vol. 48, No. 9. pp. 39-44.
Stajano, "RFID is X-ray Vision", Technical Report No. 645. University of Cambridge, Department of Computer Science. Aug. 2005. 10 Pages.
Satanford, "Pervasive Computing Goes the Last Hundred Feet with RFID Systems", Pervasive Computing, IEEE. vol. 2, Issue 2, Apr.-Jun. 2003. pp. 9-14.
Want, "An Introduction to RFID Technology", Pervasive Computing, IEEE. vol. 5, Issue 1, Jan.-Mar. 2006. pp. 25-33.
Welbourne, et al. "Challenges for Pervasive RFID-based Infrastructures", Fifth Annual IEEE International Conference on Pervasive Computing and Communications Workshops, 2007. PerCom Workshops '07. Published: Mar. 19-23, 2007. 5 Pages.
"Certified Gen 2 Tag Silicon for UHF RFID",Impinj Monza, Copyright 2006 lmpinj, Inc. 1 Page.

* cited by examiner

RFID-BASED ENTERPRISE INTELLIGENCE

BACKGROUND

1. Technical Field

An "RFID-Based Inference Platform" provides various techniques for enabling an enterprise intelligence system based on tracking of various interactions between users and objects, and in particular, to various techniques for using RFID tags in combination with other enterprise sensors and systems to track users and objects, infer their interactions, and provide these inferences for enabling further applications.

2. Related Art

Radio Frequency Identification (RFID) is a well-known electronic tagging technology that allows the detection and tracking of tags, and consequently any objects that they are affixed to. An RFID tag typically comprises a passive transponder that responds with identifying information when energized remotely by an RFID reader. This ability to do remote detection and tracking coupled with the low cost of passive tags has led to the widespread adoption of RFID in the supply chain world. RFID is used to track the movement of goods through a supply chain, whether it be pallets shipped between warehouses, cases delivered to stores, or items placed on the store shelves, thereby optimizing inventory management and yielding significant cost savings.

RFID tags come in three types: passive, active and semi-passive. Passive tags do not have any internal power supply. Instead, they use the electric current induced in the tag's antenna by the incoming RF signal from a reader to power the tag's circuitry and transmit a response back to the reader. Such tags typically have a read range from about 10 cm up to a few meters. Active tags, on the other hand, have their own internal battery to power the circuitry and transmit a response using an arbitrary RF technology such as WiFi. Due to their internal battery, active tags generally have a read range of hundreds of meters. Semi-passive tags have their own power supply to power their circuitry and to help with reception, but like passive tags, they use the RF induced current for transmitting a response back to the reader.

In particular, passive tags typically receive power through inductive or radiative coupling. Inductive coupling is used for powering LF (low frequency, 30-300 kHz) and HF (high frequency, 220 MHz) tags. Such tags receive power in the near field, which refers to the region within a few wavelengths of the reader's antenna. A reader antenna generates a magnetic field, inducing an electric current in the tag's antenna and charging a capacitor in the tag. Radiative coupling is used for UHF tags (Ultra High Frequency, above 100 MHz). In this case, the tag antenna receives signals and energy from the electromagnetic field emitted by the reader in the far field, the area beyond a few wavelengths.

RFID tags have been used for many purposes, including retail product identification and anti-theft devices. Further, RFID-based localization has been used to track tagged objects in and around RFID readers. Once such tracking systems uses a method to localize RFID tags using a mobile platform to automatically generate tag maps showing locations of objects such as people and robots in a general area. A related localization system provides techniques for finding locations of mostly static objects augmented with RFID tags, by iteratively refining observations made from multiple locations and in different directions by a mobile RFID reader, which is assumed to know its own location. This setup is integrated with a camera, which allows the image to be annotated with the estimated locations of RFID tagged objects and displayed in real time.

Several scenarios in ubiquitous computing require automatic inferencing of what a person is doing or intends to do. In the past, researchers have applied three main techniques to human-activity inference: computer vision, active sensor beacons, and passive RFID. While vision based inferencing techniques suffer from robustness and scalability problems, active sensor beacons require batteries. Approaches based on passive RFID tags avoid these difficulties, making them particularly attractive. Assuming that reliable detection of people-object interactions is possible, specific activities can be inferred from such interactions. For example, using a sufficient number of RFID tags, it can be detected that a person interacted with tea, water, and sugar. One possible inference from this interaction detection is that the person is trying to make tea. However, while conventional RFID inferencing techniques can provide rich information about such interactions, these conventional techniques tend to be either obtrusive, or require non-standard, customized RFID tags or devices (e.g., a special glove or bracelet to be worn by the user).

There has also been work on alternative, unobtrusive techniques for detecting interaction with RFID-tagged objects. One such technique uses variations in the response rate (i.e., the fraction of read attempts sent by the RFID reader that are responded to by an RFID tag) of individual tags and groups of tags to detect interaction. However, it has been observed that there is typically a sharp drop off in the response rate from 100% down to 0% depending upon range from the reader to the tags, making it hard to use response rate for detection.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In general, an "RFID-Based Inference Platform," as described herein, provides various techniques that use responses from RFID tags for automatically inferring interactions between users and/or objects (where users and objects are collectively referred to as entities) without the need to specifically identify the particular entities that are tagged. In various embodiments, inferences are made by combining RFID data received by RFID readers from the RFID tags with information from various other enterprise sensors and systems. Examples of other enterprise sensors and systems include, but are not limited to, electronic calendar systems, user presence systems, security cameras, WiFi networks, cardkey access systems, etc. The inferences are then used to enable a number of applications, such as object tracking, automated object ownership determinations, automated object cataloging, automated misplaced object alerts, video annotations, automated conference room scheduling, semi-automated object image catalogs, interaction query systems, etc.

The RFID-Based Inference Platform assumes a setting where most people (or some other object generally carried by the person such as an employee badge, car keys, cell phone, etc.) and objects are tagged with RFID tags, and the coverage of RFID readers spans some or all of the workspace. Note that the use of passive RFID tags is assumed in order to minimize cost. However, the interactive RFID reader can also use active and semi-active RFID tags in any combination desired.

Thus, given an environment covered by RFID readers, where people and objects are tagged with RFID tags, the RFID-Based Inference Platform uses RFID data received by the RFID readers to make automatic inferences regarding objects and people. Note that RFID tags associated with people are generally referred to herein as "person tags" and RFID tags associated with objects are generally referred to herein as "object tags." Further, it should be noted that merely identifying a particular tag as either a "person tag" or as an "object tag" does not specifically identify the particular person (e.g. John Smith or Jane Doe), or the specific object (e.g., book, cell phone, keys, notebook computer, etc.). However, such specific identifications are possible in many cases, depending upon the observations available to the RFID-Based Inference Platform. Consequently, that there is no requirement that tagged objects or people be specifically known (i.e., that object tagging is systematically catalogued), or that tagged objects present in a workplace even belong to the enterprise (e.g., a user's personal mobile phone can be tagged).

In particular, in various embodiments, the RFID-Based Inference Platform bootstraps from a null state, where no RFID information has been received, to a state in all tags are automatically associated either with a person or with an object. In other words, given nothing but a set of observations regarding RFID tag data (also referred to herein as "RFID events"), the RFID-Based Inference Platform automatically determines which tags are "person tags," and which tags are "object tags". In other words, the RFID-Based Inference Platform begins operation by receiving observations from a mass of undifferentiated tags. In various embodiments, the observations made by the RFID-Based Inference Platform also include inferences made based on information from other enterprise systems such as electronic calendars, user presence information, login systems, etc. The RFID-Based Inference Platform then automatically infers a range of information regarding those tags based on an accumulation of observations over time.

For example, given sufficient observations from RFID readers and other available sensors, the RFID-Based Inference Platform is able to automatically differentiate between people tags and object tags, learn the identities of people, infer the ownership of objects by specific people, learn the nature of different "zones" in a workspace (e.g., private office versus conference room), and perform other such inferences.

More specifically, since RFID data by itself only provides very limited information, basically, just the presence or absence of a particular tag in a particular zone (relative to one or more RFID readers), the RFID-Based Inference Platform also leverages information from other enterprise systems or sensors, e.g., calendar, presence, cardkey access, computer login information, etc. By combining information from these diverse sources, the RFID-Based Inference Platform records all tag-level events in a raw database (also referred to herein as an "RFID/event database"). The RFID-Based Inference Platform then uses various inference algorithms to process these raw tag-level events to infer events at the level of people, objects, and workspace zones. These inferred events are then stored in one or more databases (also referred to herein as an "inference database"). Various applications can either poll these databases (e.g., by running SQL queries) or set up triggers to be notified of specific events of interest.

In view of the above summary, it is clear that the RFID-Based Inference Platform described herein provides various unique techniques for combining RFID events with information from other enterprise systems and sensors to make automated inferences about people, objects, workspaces, and their interaction. These inferences are then used to enable a large number of inference-based applications. In addition to the just described benefits, other advantages of the RFID-Based Inference Platform will become apparent from the detailed description that follows hereinafter when taken in conjunction with the accompanying drawing figures.

DESCRIPTION OF THE DRAWINGS

The specific features, aspects, and advantages of the claimed subject matter will become better understood with regard to the following description, appended claims, and accompanying drawings where:

DETAILED DESCRIPTION OF THE EMBODIMENTS

Figure 1:
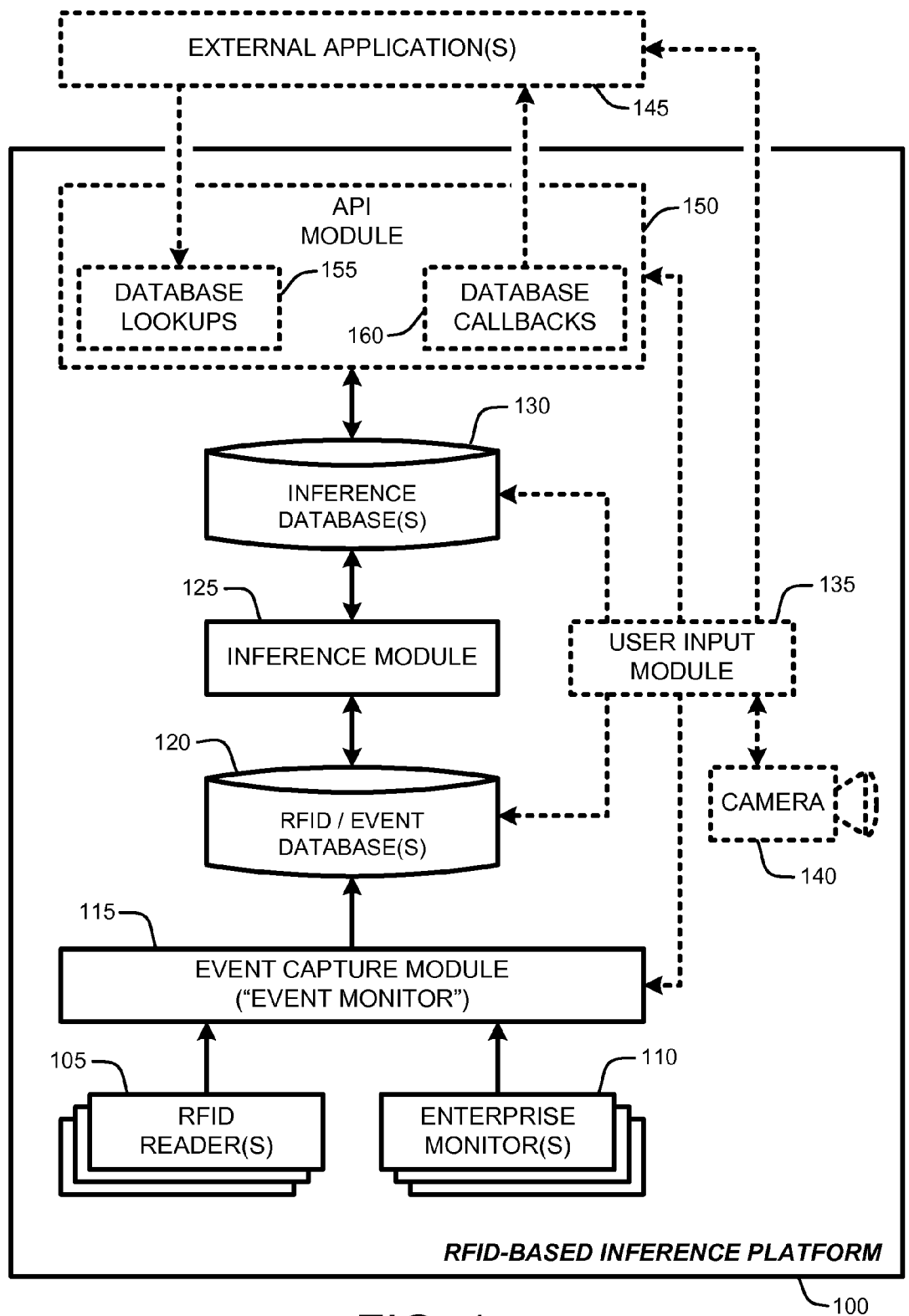
FIG. 1 provides an exemplary architectural flow diagram that illustrates program modules for implementing various embodiments of an RFID-Based Inference Platform, as described herein.

In the following description of the embodiments of the claimed subject matter, reference is made to the accompanying drawings, which form a part hereof, and in which is shown by way of illustration specific embodiments in which the claimed subject matter may be practiced. It should be understood that other embodiments may be utilized and structural changes may be made without departing from the scope of the presently claimed subject matter.

1.0 Introduction:

Note that the following discussion assumes the use of passive RFID tags in order to minimize overall system cost. However, both active and semi-passive RFID tags, and any combination thereof, may also be used. Further, both RFID tags and RFID readers are well known to those skilled in the art and will not be described in detail herein.

In general, an "RFID-Based Inference Platform," as described herein, provides various techniques that use response from RFID tags for automatically inferring interactions between users and/or objects (where users and objects are collectively referred to as entities) without the need to specifically identify the particular entities that are tagged with RFID tags. Note that in some cases specific RFID tags may be associated with particular entities (such as, for example, a known ID for the RFID tag of an employee badge). However, as described in detail herein, the RFID-Based Inference Platform is able to operate successfully from an initial state in which some or all of the RFID tags are initially unknown (or random). In various embodiments, inferences are made by combining RFID tag data received by one or more RFID readers with information from various other enterprise sensors and systems. Examples of enterprise sensors and systems include, but are not limited to, electronic calendar systems, user presence systems, security cameras, microphones, WiFi networks, etc.

For example, by combining RFID events with information obtained from other enterprise systems such as a shared calendar, the RFID-Based Inference Platform is able to make a number of inferences automatically. One simple example of such inferences is that the RFID-Based Inference Platform automatically differentiates between "person tags" and "object tags" (i.e., RFID tags associated with people or objects, respectfully), and learns who the likely owner of a particular object is, even if the specific identity of the person or object is unknown. The inferences are then used to enable a number of applications, such as object tracking, automated object ownership determinations, automated object cataloging, automated misplaced object alerts, video annotations (i.e., indexing of video based on when particular objects or persons were in or around a region captured by the video), automated conference room scheduling, semi-automated object image catalogs, interaction query systems, etc.

Further, there is no requirement that tagged objects be specifically known (i.e., that object tagging is systematically catalogued), or that tagged objects present in a workplace even belong to the enterprise (e.g., a user's personal mobile phone can be tagged). In fact, rather than requiring systematic cataloging of all objects (and people), in various embodiments, the RFID-Based Inference Platform is capable of making all inferences automatically, without requiring any human input. However, even in settings where human input is available to specifically identify one or more tagged objects or people, the inference techniques provided by the RFID-Based Inference Platform can help catch errors, e.g., incorrect ownership information for an object being recorded in a catalog.

Further, it should also be noted that the discussion regarding the RFID-Based Inference Platform provided herein generally focuses on applying RFID to an enterprise setting, such as a corporate office or university department with many people, any of which may be mobile or stationary at any given point in time. However, the techniques described herein are applicable to other environments, such as in a home, a small business, or in other public or private locations.

For example, a typical environment in which the RFID-Based Inference Platform would be useful is an enterprise setting such as a large business having large numbers of people. Such environments typically involve extensive interactions amongst people, between people and objects, and between people and workspaces. For instance, people own objects such as books, cell phones, and laptops, which they often carry around and sometimes misplace. The RFID-Based Inference Platform provides a platform for tracking and inferring such interactions, and then exposing these to the higher layers via APIs that allow various applications and services to interact with the inferred information. Thus, the RFID-Based Inference Platform raises the level of abstraction for applications in this domain beyond tag-level events. In other words, the RFID-Based Inference Platform represents a form of mobile computing applied to non-computing entities by automatically inferring interactions between people and/or objects, then providing those inferences to enable other applications.

Regardless of the particular environment, the RFID-Based Inference Platform assumes a setting where most people (or some other object generally carried by the person such as an employee badge, car keys, cell phone, etc.) and objects are tagged with RFID tags, and the coverage of RFID readers spans much of the workspace. Further, since RFID by itself only provides very limited information, basically, just the presence or absence of a tag in a particular zone, the RFID-Based Inference Platform also leverages information from other enterprise systems, e.g., calendar, presence, login information, etc. By combining information from these diverse sources, the RFID-Based Inference Platform records all tag-level events in a raw database. The RFID-Based Inference Platform then uses various inference algorithms to process these raw tag-level events to infer events at the level of people, objects, and workspace zones. These inferred events are then stored for future use. For example, by storing the inferred events in one or more databases, various applications can either poll these databases (e.g., by running SQL queries) or set up triggers to be notified of specific events of interest.

More specifically, in various embodiments, the RFID-Based Inference Platform makes inferences regarding tagged entities (i.e., objects and/or people) without the need to specifically catalog tagged people and objects. These inferences are generally made by starting with a mass of undifferentiated tags, and then automatically inferring a range of information based on an accumulation of observations over time. In fact, given sufficient observations, the RFID-Based Inference Platform is able to automatically differentiate between people tags and object tags, learn the identities of people, infer the ownership of objects by people, learn the nature of different zones in a workspace (e.g., private office versus conference room), and perform other such inferences.

Further, it should be noted that merely identifying a particular tag as either a "person tag" or as an "object tag" does not specifically identify the particular person (e.g. John Smith or Jane Doe), or the specific object (e.g., book, cell phone, keys, notebook computer, etc.). However, such specific identifications are possible in many cases, depending upon the observations available to the RFID-Based Inference Platform. Consequently, that there is no requirement that tagged objects or people be specifically known (i.e., that object tagging is systematically catalogued), or that tagged objects present in a workplace even belong to the enterprise (e.g., a user's personal mobile phone can be tagged).

Mobility of people and objects over time is an important part of the inferences performed by the RFID-Based Inference Platform. For example, tags attached to people are more likely to move, with less dependence on other tags, than tags attached to objects. Likewise, the owner of an object is likely to be the person who carries it around the most.

For example, in the case of a "misplaced object alert," assume that a user typically carries her cell phone with her. Then, if the user leaves her cell phone in some location monitored by the RFID-Based Inference Platform, an alert is automatically sent to the user (email, text message, automated phone call, announcement over an area intercom system, etc.) that informs the user when and where she left her cell phone. Note that there is no need for the RFID-Based Inference Platform to know that the particular object is a cell phone. It is sufficient that the RFID-Based Inference Platform has inferred ownership of the object for the particular user (without necessarily knowing the identity of that user), has inferred that the user and the object are generally co-located, and then tells the user when and where they left they left the object that they typically carry on their person. In the case where the nature of that object (e.g., keys, cell phone, book, etc.) or the name of the person is specifically known, this information can be provided with the misplaced object alert, if desired.

Typically, for purposes of security, the RFID-Based Inference Platform will be run by one or more central servers, rather than by individual users. This includes the raw and processed databases (i.e., tag-level events and inferences, respectively), and the applications that consume the information contained in these databases. While such a model limits flexibility, it greatly simplifies deployment issues, specifically with regard to privacy. In this case, individual user's are unable to access the RFID-Based Inference Platform databases; they are only presented with information that the centrally-run application chooses to expose, e.g., alerts regarding a user's own objects that have been misplaced. However, it should be clear that there is no requirement to limit user access to particular elements or databases of the RFID-Based Inference Platform, and that any such limitations are merely provided for security or privacy purposes.

Further, in various embodiments, security issues are further addressed by employing a simple tag relabeling scheme to defeat any attempts to reconstruct the database surreptitiously, say using input from rogue readers. While the enterprise itself will have access to potentially privacy-sensitive data, this is not fundamentally different from the present situation. For example, in many countries, the enterprise has legally sanctioned access to sensitive information such as the employees' email and files (largely in an unencrypted form), and indeed also the ability to track user movements to an extent based on cardkey based access control (which is often based on short-range RFID) to various physical spaces.

1.1 System Overview:

As noted above, the RFID-Based Inference Platform provides various techniques for combining RFID events with information from other enterprise systems and sensors to make automated inferences about people, objects, workspaces, and their interaction. These inferences are then used to enable a large number of inference-based applications. The processes summarized above are illustrated by the general system diagram of FIG. 1. In particular, the system diagram of FIG. 1 illustrates the interrelationships between program modules for implementing various embodiments of the RFID-Based Inference Platform, as described herein. Furthermore, while the system diagram of FIG. 1 illustrates a high-level view of various embodiments of the RFID-Based Inference Platform, FIG. 1 is not intended to provide an exhaustive or complete illustration of every possible embodiment of the RFID-Based Inference Platform as described throughout this document.

In addition, it should be noted that any boxes and interconnections between boxes that are represented by broken or dashed lines in FIG. 1 represent alternate embodiments of the RFID-Based Inference Platform described herein, and that any or all of these alternate embodiments, as described below, may be used in combination with other alternate embodiments that are described throughout this document.

In general, as illustrated by FIG. 1, the processes enabled by the RFID-Based Inference Platform 100 begin operation by using a collection of RFID readers 105 to read tad IDs of all RFID tags within range of those RFID readers. As discussed in further detail below, one or more RFID tags having unique IDs are affixed to people (or objects closely associated with people, such as employee badges) and to objects within range of one or more of the RFID readers. There is no need to initially indentify which tags are affixed to particular people or objects, since, as described in further detail below, the RFID-Based Inference Platform 100 automatically differentiates between tags associated with or affixed to people and tags affixed to objects. Given this differentiation, the RFID-Based Inference Platform then infers additional information including identities of people, ownership of specific objects, the nature of different "zones" in a workspace (e.g., private office versus conference room), etc.

More specifically, an event capture module 115, also referred to herein as an "event monitor," periodically receives time-stamped RFID tag data (at regular and/or irregular intervals) from each of the RFID readers 105 placed in various locations throughout some area of interest (such as an office building, a school, a home, a public location, etc.). In various embodiments, the RFID readers 105 either automatically perform tag reads, or perform tag reads at some interval directed by the event capture module 115. Note that identification of various "zones" covered by the RFID readers 105 is not required, since, as described in further detail below, the RFID-Based Inference Platform automatically infers the nature of different "zones" covered the RFID readers in the workspace.

In addition to receiving RFID tag data from the RFID readers 105, the event capture module 115 also receives event data from other enterprise monitors or sensors throughout the workspace. Examples of other enterprise monitors 110 include, but are not limited to, electronic calendar systems, user presence systems, security cameras, microphones, WiFi networks, cardkey access systems, smoke detectors, fire alarms, light switches, etc. (see Section 2.2.2 for additional discussion regarding enterprise monitors). Note that data received from the enterprise monitors 110 is automatically time-stamped, either by the event capture module 115 or by the enterprise monitor, as applicable, so that it can be correlated with the RFID tag data.

All event data received by the event capture module 115 from both the RFID readers 105 and the other enterprise monitors 110 is stored to a raw RFID/event database 120. An inference module 125 (also referred to herein as an "inference engine") then evaluates the RFID/event database 120 on an ongoing basis as more event data becomes available in order to infer particular properties or information relating to each of the unique tag IDs represented in the RFID/event database. For example, in various embodiments, the inference module 125 automatically differentiates between tags associated with or affixed to people and tags affixed to objects. The inference module 125 then infers additional information including identities of people, ownership of specific objects, the nature of different "zones" in the workspace, etc. (see Section 2.3 for a detailed discussion of automated inferences).

Inferences made by the inference module 125 are then stored to an inference database 130. Note that since inference may change over time, as more observations of RFID tag data and enterprise monitor 110 information becomes available, inferences in the inference database 130 may be periodically changed or updated. As noted above, the inferences in the inference database 130 includes differentiation between "people tags" associated with or affixed to people and "object tags" affixed to objects. The inference database 130 also includes additional inferences such as identities of people associated with particular person tags, ownership of specific objects relative to specific person tags, the nature of different "zones" in the workspace, etc.

In addition, in various embodiments, a user input module 135 is provided to allow the user to directly interact with either or both the RFID/event database 120 and the inference database 130, or to interact with the inference database via either the API module 150 or one or more applications 145. For example, in one embodiment, the RFID-Based Inference Platform 100 provides a semi-automated object cataloging application that allows a user to add photographs of particular tagged objects (captured via a camera 140) to the RFID/event database 120 (or some separate database linked to the RFID object database, not shown).

In various embodiments, the RFID-Based Inference Platform 100 exposes the inference database 130 to one or more external applications 145 via an API module 150. Note that as is well known to those skilled in the art, an "API" is an "application programming interface" that generally provides a source code interface that an operating system, library, service, application, etc., uses to support requests to particular information made by various computer programs.

More specifically, the API module 150 provides a set of one or more APIs that allow various applications 150 to access or interact with the inference database 130 via database lookups 155 and/or database callbacks. See Section 2.2.6 and Section 2.6 for a detailed discussion of API implementation and programming models in the RFID-Based Inference Platform 100. Various example of applications 150 enabled by the RFID-Based Inference Platform 100 are described in further detail in Section 2.7. For example, these applications 150 include, but are not limited to automated misplaced object alerts, automated video annotation and indexing, automated conference room booking, semi-automated image catalogs, etc.

2.0 RFID-Based Inference Platform Operational Details:

The above-described program modules are employed for implementing various embodiments of the RFID-Based Inference Platform. As summarized above, the RFID-Based Inference Platform provides various techniques for combining RFID events with information from other enterprise systems and sensors to make automated inferences about people, objects, workspaces, and their interaction. These inferences are then used to enable a large number of inference-based applications.

The following sections provide a detailed discussion of the operation of various embodiments of the RFID-Based Inference Platform, and of exemplary methods for implementing the program modules described in Section 1 with respect to FIG. 1. In particular, the following sections describe examples and operational details of various embodiments of the RFID-Based Inference Platform, including: an operational overview of the RFID-Based Inference Platform; an architectural overview of the RFID-Based Inference Platform; exemplary algorithms for making automated inferences from RFID tag IDs and associated event data; considerations for improving system reliability; privacy considerations; programming models for exposing inferences to external applications via APIs; and exemplary applications for using inferences regarding RFID tag IDs.

2.1 Operational Overview and Assumptions:

In general, the RFID-Based Inference Platform acts to automatically combine RFID events with information from other enterprise systems and sensors to make automated inferences about people, objects, workspaces, and their interaction. More specifically, the RFID-Based Inference Platform provides various techniques for using RFID tags in combination with other enterprise sensors to track users and objects and infer their interactions. Additional inferences are then made using this data to infer specific identities of people, ownership of specific objects, the nature of different "zones" in a workspace (e.g., private office versus conference room). These inferences are then used to enable various applications including object tracking, automated object ownership determinations, automated object cataloging, automated misplaced object alerts, video annotations, automated conference room scheduling, semi-automated object image catalogs, object interaction query systems, etc.

Again, it should be noted that in the following paragraphs, the discussion regarding the RFID-Based Inference Platform generally focuses on applying RFID to an enterprise setting, such as a corporate office or university department with many people, any of which may be mobile or stationary at any given point in time. However, the techniques described herein are applicable to other environments, such as in a home, a small business, or in other public or private locations.

As noted above, the RFID-Based Inference Platform is adaptable for use in a variety of operating environments. However, for purposes of explanation, the following discussion will focus on a typical enterprise setting with widespread coverage of RFID readers, and where most or all people and objects are tagged with passive RFID tags.

Further, while tagged objects and people can be cataloged, the following discussion assumes that the RFID-Based Inference Platform begins with a blank slate. That tags associated with either objects and/or people initially represent an undifferentiated mass of tags. In addition, it should also be noted that in various embodiments, users are free to pick up new tags and affix them to objects, as and when needed.

It is also assumed that users have access to a computing environment that provides services such as network logins, shared calendars, and online presence, which can be monitored by the RFID-Based Inference Platform. This is increasingly the case in enterprises, with the adoption of networked systems such as Microsoft ® Exchange and IBM® Lotus Notes®.

2.2 RFID-Based Inference Platform Architectural Overview:

FIG. 1, as described above, generally illustrates the basic architecture of various embodiments of the RFID-Based Inference Platform architecture. Primary components of the RFID-Based Inference Platform include the event capture module 115 for receiving RFID data and other sensor or system data, the RFID/event database 120, the inference module 125 (also referred to herein as the "inference engine"), the inference database 130, and the API or other interface for providing application access to the inference database.

Figure 2:
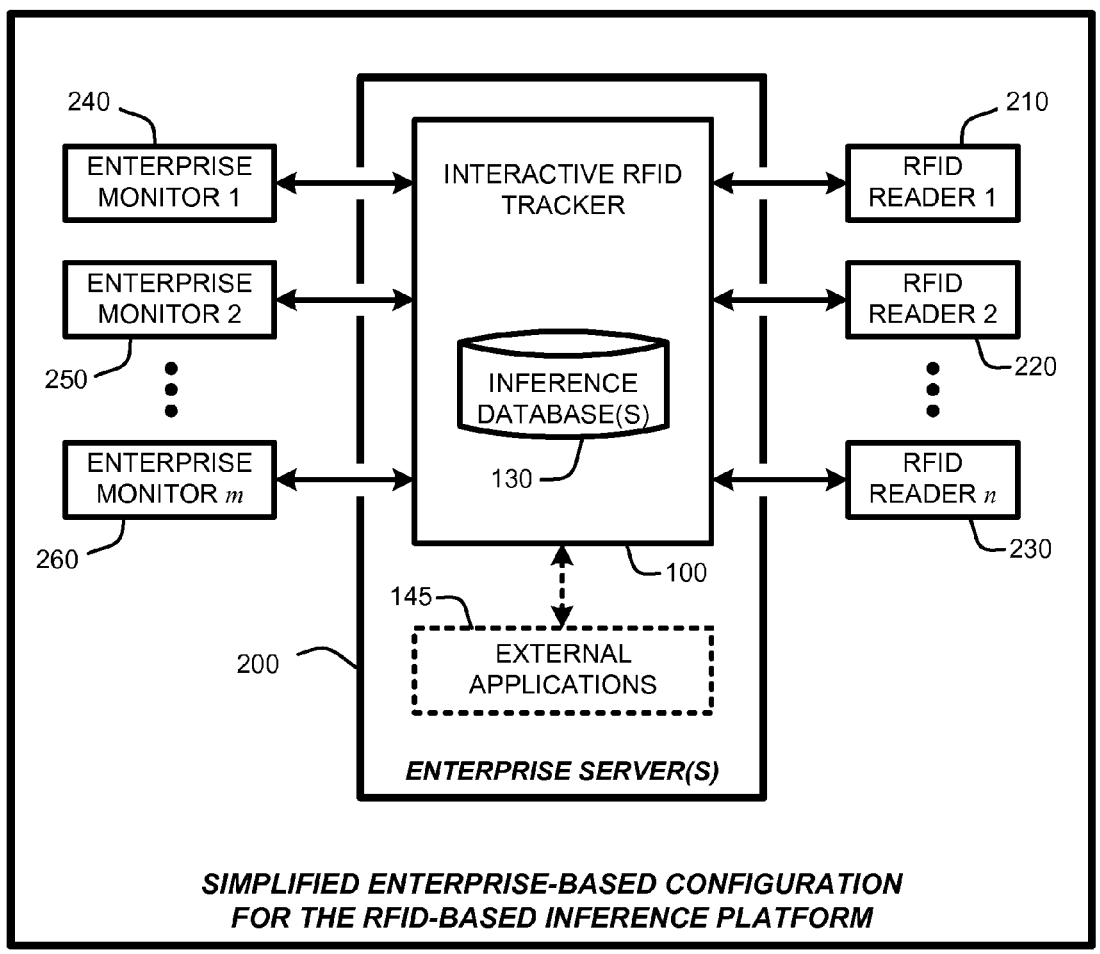
FIG. 2 illustrates a simplified enterprise-based configuration of the RFID-Based Inference Platform, as described herein.

In a tested embodiment, as illustrated by FIG. 2, these primary components were run centrally by the enterprise. In particular, the RFID-Based Inference Platform 100 was hosted on an enterprise server 200, such that the various components of the RFID-Based Inference Platform 100 were trusted (assuming trusted servers for the Enterprise). A set of RFID readers 210, 220 and 230 were coupled to the enterprise server 200, such that all tag readings captured by the RFID readers were passed by the enterprise server to the RFID-Based Inference Platform 100. Similarly, a set of enterprise monitors 240, 250 and 260 ( ) were also coupled to the enterprise server 200, such that all events captured by the monitors were passed by the enterprise server to the RFID-Based Inference Platform 100. Given the RFID data and event data, the RFID-Based Inference Platform 100 constructs the inference database 130 as described herein. This inference database 130 is then exposed to various external applications 145, as desired.

This type of configuration provides the (trusted) inference engine access to the complete set of sensed data across all users, objects, and zones, allowing it to make effective inferences. Similarly, the (trusted) application is allowed the flexibility of working with a complete set of inferences (i.e., inferences pertaining to all users and their objects), yet control what processed information is presented to the users to ensure privacy.

Note that there is no requirement for any of these databases to be either trusted or secure. In fact, the inference engine and/or applications or other primary components of the RFID-Based Inference Platform can be run and access by individual users on their own desktop machines if desired. However, in this case, privacy issues can be considered, if desired, to restrict the set of information made available to these users. For example, privacy considerations could disallow an application run by one user from accessing inferences pertaining to another user. Such limitations would make it more difficult to implement new functionality or applications based on the inference database, such as an automatic conference room scheduling feature discussed in Section 2.7.

2.2.1 Event Monitor:

The event monitor (see element 115 of FIG. 1) makes use of conventional RFID readers placed in known locations throughout the region being covered by the RFID-Based Inference Platform in order to capture RFID data for each particular "zone." In general, the event monitor issues periodic read commands to each of the RFID readers, which then take RFID readings and provide the results back to the event monitor. Alternately, the RFID readers can be set to automatically take RFID readings. In this case, the event monitor simply records those readings as they are received from the various RFID readers. Note that the RFID data provided by each reader includes the "electronic product code" (EPC) and the signal strength (RSSI) of the tags read via each of its antennas. This data then gets pushed into the raw RFID/event database.

As is well known to those skilled in the art, when a conventional RFID reader energizes an RFID reader antenna, any tags within range of that RFID reader get activated and respond with their ID (e.g., a 96-bit EPC) and possibly other data, such as the RSSI. Note that the RSSI ("Received Signal Strength Indication" is a conventional measurement of the power present in the radio signal received by the RFID reader from the RFID tag. As discussed in further detail below, the RSSI is used to determine proximity or distance of a particular RFID tag to a particular RFID reader. Many conventional RFID readers include RSSI capabilities. Such capabilities are well known to those skilled in the art, and will not be described in detail herein.

2.2.2 Other Enterprise Monitors:

As noted above, the RFID-Based Inference Platform makes inferences based on a combination of RFID data and other enterprise sensors or monitors. These other monitors act to capture or monitor some or all of the information listed below. The event monitor receives data from these other enterprise monitors and push their updates into the raw RFID/event database. Examples of some of the various enterprise monitors/sensors used by various embodiments of the RFID-Based Inference Platform include, but are not limited to:

1. Calendar Monitor: The "calendar monitor" typically resides on each user's desktop machine, and monitors the time and location of the user's appointments. Typically, a conventional calendar or scheduling program will be integrated with enterprise-wide applications such as Microsoft® Exchange and IBM® Lotus Notes®, or within an operating system attached to a local enterprise network. In various embodiments, the RFID-Based Inference Platform uses events associated with such programs in performing various inferences, as described in further detail below.
2. Presence Monitor: The "presence monitor" provides the status of each user's interaction with their desktop computer (or networked attached notebook computer or similar device). Such computing devices are said to be "idle" when they have not received any user input for some predetermined period of time (e.g., 2 minutes in a tested embodiment). Transitions from idle to active state are automatically detected and reported to the event monitor.
3. Login Monitor: The "login monitor" is similar to the presence monitor except that, in general, login is considered to be a much stronger indication of a user being present than simply a change in their machine's idle state. Further, such information is also useful in associating particular RFID tags with specific individuals. For example, if the same RFID tags are always near a particular person when that person performs a login on a computer, then such information is useful for associating particular RFID tags with the specific individual performing the login.
4. Cameras: Many locations, such as office buildings, public areas, private homes, etc., are often equipped with cameras for security reasons. In various embodiments, the video feeds from one or more such cameras is stored in a video database for future analysis, if the need arises. For example, as discussed in further detail in Section 2.7, such video feeds can be automatically indexed relative to persons or objects in proximity to the camera at any given point in the recorded video sequence. Clearly, such automated video indexing can enable a large number of multimedia-based applications.
5. Microphones: Note that audio data captured by a microphone, either with a corresponding video feed from a network attached camera, or by itself, can be indexed in the same way that video feeds are indexed. As such, one or more separate audio feeds can be automatically indexed relative to persons or objects in proximity to the microphone (or camera with integral or attached microphone) at any given point in the recorded audio sequence. Clearly, such automated audio indexing can enable a large number of multimedia-based applications.
6. Note that audio data captured by a microphone either with a corresponding video feed, or by itself, can be indexed in the same way that the video is indexed. As such, one or more separate audio feeds can be automatically indexed relative to persons or objects in proximity to the camera at any given point in the recorded video sequence. Clearly, such automated video indexing can enable a large number of applications.
7. Networked Attached Sensors: In many locations, such as office buildings, public areas, private homes, etc., various sensors are attached to the local network for a variety of purposes. Such sensors include, for example, smoke detectors, fire alarms, light switches, temperature control systems or sensors, alarm systems, medical event monitors (e.g., heart rate, blood pressure, etc.), or any of a number of other sensors or devices. Basically, the general idea here is that if the data captured by the sensor or device can be time-stamped and captured by the RFID-Based Inference Platform for inclusion in the RFID/event database, then inferences can be made from the captured data for inclusion in the inference database.

2.2.3 Raw RFID/Event Database:

As noted above, the RFID/event database simply provides a storage mechanism for logging and recording RFID data received from the various RFID tags within range of each RFID reader. The RFID/event database also logs and records data from the other enterprise monitors. Note that in the case of video cameras, the resulting video feeds can either be stored in the raw RFID/event database, or if stored separately, links to that data can be provided for later use in making inferences or indexing that video, as described in further detail below.

2.2.4 Inference Engine:

In general, the inference engine (see element 125 of FIG. 1) operates on the raw RFID/event database using one or more of the various inference algorithms described below in Section 2.3 to draw inferences about people, objects, and workspaces.

2.2.5 Processed Inference Database:

In general, the processed inference database (see element 130 of FIG. 1) is populated by the inference engine with the inferences from the data contained in the RFID/event database. Further, in various embodiments of the RFID-Based Inference Platform, the inferences in the processed inference database are made available to applications built on top of the RFID-Based Inference Platform. For example, one such application is the "misplaced object alert" mentioned above.

2.2.6 API:

As noted above, the processed inference database can be made available to other applications for any of a variety of uses. While each application can access the processed inference database directly, with or without lock and/or exclusive control of that database, it has been observed that a better method for addressing the processed inference database is to provide an API or set of API's, or the like, that allows the processed inference database to be shared among multiple applications. In this case, the RFID-Based Inference Platform provides a set of APIs for applications to look up the inferences stored in the processed database or to receive callbacks when new inferences are made. Note that the use of API's for allowing multiple applications to access databases in this manner is well known to those skilled in the art, and will not be described in detail herein. Some of the applications enabled using these techniques are described in combination with an example of a programming model for interacting with the processed inference database in Sections 2.6 and 2.7.

2.2.7 Applications:

As noted above, a variety of applications can be built using the APIs exposed by the RFID-Based Inference Platform. A sampling of a few of these applications is discussed in Section 2.7.

2.3 Exemplary Algorithms for Automated Inferences:

The following paragraphs describe various inference algorithms and considerations used by the RFID-Based Inference Platform inference engine (see element 125 of FIG. 1) to perform automatic inference and to address various concerns. In general, as noted above, the various inference algorithms provided by the RFID-Based Inference Platform operate on a stream of events, both from the RFID readers and from other enterprise systems, to make several inferences automatically.

For purposes of explanation, it will be assumed that all people and objects are tagged and that these tags are read reliably by one or more of the RFID reader antennas that covers the zone they are in (note that each zone has at least one RFID reader). However, the following discussion will also address the impact of deviations from this ideal, such as where less than all objects and/or people have an RFID tag, or where one or more objects and/or people have multiple RID tags.

In general, "movement," m, is quantified in terms of the number of inter-zone transitions made by an object within some period of time. For example, if a person takes a walk through 4 zones along the path, A→B→C→D, this would correspond to 3 units of movement, or simply, m=3, as in: 1) zone A to zone B; 2) zone B to zone C; and 3) zone C to zone D.

A significant portion of the analysis of RFID and other event data is based on the movement of tags between zones. For purposes of explanation, it is conceptually assumed that these zones are non-overlapping. In practice, however, multiple zones may overlap (i.e., the tag is read by more than one antenna at the same time). In one embodiment, the issue of multiple concurrent reads of the same RFID tag is addressed by effectively eliminating the overlap by filtering out all concurrent reads of a particular tag from multiple antennas except for the one with the strongest signal strength (e.g., the largest RSSI).

Further, in a related embodiment, to eliminate the possibility of incorrect inferences made because of spurious inter-zone movement, any movement between overlapping zones can also be disregarded. For example, if a person stands between a particular tagged object and a first RFID reader antenna, it is possible that a second RFID reader may read the tag of that object with a higher RSSI. If the person then moves from between the tagged object and the first RFID reader, then the first RFID reader may read the tag of that object with a higher RSSI than the second reader, even though the object has not moved between zones. Thus, elimination of movement between overlapping zones can address the problem of spurious inter-zone movement. Note that careful placement of RFID reader antennas, such as on or near the ceiling of a room rather than on or near walls, can partially address issues such as partial blockage of an RFID tag by an intervening object such as a person.

2.3.1 Person-Object Differentiation:

The idea behind person-object differentiation is to take an undifferentiated mass of tags and classify each tag as either belonging to a person or to an object. A "person tag" refers to a tag affixed, say, to a person's employee badge, which is (almost) always carried by the person.

One essential difference between people and objects pertains to their mobility. People can move on their own whereas objects generally move only when carried by a person. (Note that a special identifier, such as a "mobile object tag" or the like can be used to identify mobile non-person objects such as a robot or the like). However, for purposes of explanation, the following discussion will assume just people and objects that generally do not move unless physically moved by a person.

To make the differentiation between person tags and object tags, the RFID-Based Inference Platform can simply measure the amount of inter-zone movement exhibited by each tag and classify the ones with a high degree of movement as people and the rest as objects. However, in addition to the problem of defining a suitable threshold on the degree of movement to decide whether a particular tag is a person tag, there is also the more basic problem that this heuristic could yield the wrong inference in many cases. For instance, an object belonging to an active person (e.g., his/her mobile phone) might well exhibit far more movement than a sedentary person who could be inadvertently labeled as an object.

Therefore, in various embodiments, this issue is addressed by using a "co-movement" based heuristic. The basic idea here is to consider the movement of a tag not in isolation, but in relation to the movement of any other tags that it moves with. Two tags are said to move together when they make the same inter-zone transition at about the same time. The movement of a tag is compared with the movement other tags, whether attached to objects or to people, that it moves with at some point. If, on average, a particular tag moves more than the other tags with which co-movement is observed, then that tag is deemed to be a person tag. Otherwise, it is classified as an object tag. This, in the above example, the high degree of movement exhibited by an active person's mobile phone would be compared with the even higher degree of movement of the active person himself/herself. Consequently, the phone would not be misclassified as a person.

In particular, consider a tag T that exhibits a total movement of m. (Recall that this corresponds to m inter-zone transitions, as noted above.) Let the set of tags that T moves with at some point in time (i.e., makes a near-simultaneous inter-zone transition with at some point) be: $CM_T = \{T_1, T_2, \ldots, T_n\}$. $CM_T$ is referred to as the co-movement set for T. Let $m_1, m_2, \ldots, m_n$ represent the amount of total movement (with or without T being present) exhibited by $T_1, T_2, \ldots, T_n$, respectively, and $c_1, c_2, \ldots, c_n$ be the amount of co-movement exhibited by each of these tags together with T. Let $C = \Sigma_{i=1 \ldots n} c_i$. Then, a "relative movement metric," $RM_T$, is defined for tag T as illustrated by Equation 1, where:

$$RM_T = m - \sum_{i=1\ldots n} \frac{c_i}{C} m_i \qquad \text{Equation 1}$$

Intuitively, $RM_T$ is the amount by which T moves minus the average movement exhibited by the tags it moves with. In one embodiment, the RFID-Based Inference Platform weights the movement of each other tag by the amount of its co-movement with T (as reflected in the $$\frac{c_i}{C}$$

factor) to avoid having occasional co-movements skew the metric. For instance, a sedentary person might occasionally move with a highly active person. However, we would not want this to obscure the much more frequent co-movements that the sedentary person exhibits with one or more of his/her objects.

The RFID-Based Inference Platform computes the $RM_T$ for all tags T. Then the RFID-Based Inference Platform finds the tag T that has the largest (positive) $RM_T$ and declares it to be a person tag. The RFID-Based Inference Platform then adjusts the co-movement sets for other tags as follows. Consider two other tags, say $T_1$ and $T_2$, that exhibit co-movement with T. To decide whether there are any instances of co-movement between $T_1$ and $T_2$, the RFID-Based Inference Platform first eliminates all instances where T (which has already been declared to be a person tag) also moved. Only if $T_1$ and $T_2$ move together without co-movement by T as well does the RFID-Based Inference Platform consider $T_2$ to be part of $T_1$'s co-movement set, and vice versa. The intuition is that when there is already a person present to explain a movement, the RFID-Based Inference Platform should not use the same movement as evidence of another tag being a person. For instance, this would prevent a person's mobile phone, which is often carried by the person, from itself being mistakenly classified as a person based on its apparent co-movement with a book that the person also carries on occasion.

Once the co-movement information has been adjusted as noted above, the RFID-Based Inference Platform recomputes $RM_T$ for all of the remaining tags and repeats the above process so long as there remains a tag with a positive $RM_T$. Once the RFID-Based Inference Platform reaches the point where $RM_T$ is negative for all of the remaining tags, the RFID-Based Inference Platform declares these to be object tags and terminate the algorithm.

Finally, tags that do not exhibit any movement are simply classified as object tags. People are very unlikely to remain immobile for days or even hours at a stretch. On the other hand, an object such as a book may never move out of the zone corresponding to the owner's office. Note that in the case where a tag has been previously identified as a person tag exhibits behavior such as remaining immobile for some predetermined period of time, such as hours or days, an emergency alert with tag location can be provided to appropriate individuals in case the person associated with that tag has become injured or otherwise incapacitated.

2.3.2 Object Ownership:

Having classified tags as people or objects, the RFID-Based Inference Platform next turns to the question of inferring the owner (obviously a person) of each object. In one embodiment, co-movement is used to correlate with ownership (i.e., an object is generally carried by its owner). However, this simple heuristic may fail in some common situations. For instance, a person might be the owner of a book he/she owns that is located in that person's office. Further, it is possible that the only time when that book moves across zones is when someone else borrows it. Consequently, a co-movement based inference would likely get confused and attribute ownership of the book to the occasional borrower.

Therefore, in another embodiment, the RFID-Based Inference Platform uses a simple co-presence based heuristic, which works as follows: For each object, the RFID-Based Inference Platform simply keeps track of the amount of time that the object is concurrently present in the same zone as a person. The person with which an object is co-present the most is deemed to be the owner of the object. For instance, all objects that are owned by a person and that are generally in his/her office would be deemed to be owned by that person since it is presumably he/she who would be spending the most amount of time in the same zone (i.e., his/her own office) at the same time as those objects. While there is the possibility of misclassification (e.g., when an object is borrowed by another person who holds it for longer than the owner himself/herself had it), the likelihood of this event is expected to be relatively low.

In addition, there are also cases of objects that are not owned by anyone in particular, e.g., a book in a common lounge or a mug in a kitchen. The above heuristic would generally find that no one person dominates the co-presence metric for such an object, and this observation could be used to identify it as a "shared object tag."

Finally, in another embodiment, the user is provided with a user interface for specifically associating particular tags with that user as the owner. This can be accomplished in various ways. For example, the user can simply specify that some set of RFID tags are object tags owned by the user. The user can then place one or more of those tags on one or more objects. In this case, ownership is attributed based on the specified association rather than one of the aforementioned ownership heuristics. Note that RFID tags are often flexible tags that have an integral adhesive surface that is exposed by peeling a covering from the adhesive surface. Consequently, many RFID tags are simply "peel and stick" in nature, thereby allowing the user to easily attach tags to objects.

2.3.3 Zone Identification:

An office building (or other location such as a home or public space) typically has different kinds of workspaces. For example, there are "workspaces" assigned to individuals, such as private offices, semi-private cubicles, or desks. There are "shared spaces," including either reserved spaces such as meeting rooms or non-reserved spaces such as lounges or reading rooms. Finally, there are also common areas such as hallways, stairwells, and kitchen areas, which people generally move through rather than stay put in for significant lengths of time (occasional hallway conversations notwithstanding).

Although an enterprise may know the nature of each physical workspace, it would be require additional overhead to keep this in sync with the RFID deployment and the zone of coverage of the many RFID antennas (e.g., an antenna may be moved or pointed differently without the master database being updated). Therefore, in various embodiments, the RFID-Based Inference Platform automatically classifies workspaces (actually, the RFID zones covering those workspaces) using information on the presence, movement, and calendar information of people (not objects), as follows:

1. "Individual Workspace": If there is one person who is predominantly present in a zone, the RFID-Based Inference Platform deems that to be an individual workspace for that person.
2. "Shared Workspace": If no one person is predominantly present in a zone, and the mean residence time of a person in the zone (i.e., the length of time from when the person enters the zone to when they exit it) is greater than some fixed or adjustable threshold, the RFID-Based Inference Platform deems the zone to be a shared workspace. Note that in tested embodiments, a threshold on the order of about 5-10 minutes was found to be sufficient to differentiate such a space from a common area that people simply pass through.
3. "Reserved Shared Workspace": A shared space such that people who are present in the space for more than a threshold period often have common meeting entries in their calendars, with matching locations and times, is deemed to be a reserved shared workspace (e.g., a reserved meeting room).
4. "Common Areas": Any space that is not classified as one of the above is deemed a common area.

2.3.4 Person Identification:

Having identified the nature of tags (person vs. object) and the nature of workspaces, in various embodiments, the RFID-Based Inference Platform acts to automatically infer the identity of the person corresponding to a particular person tag. In general, in many modern workplaces, with one or more computers at every desk, a user often interacts with their computer soon after entering their office (e.g., by logging in or causing their presence information to transition from "away" to "online"). Consequently, it is expected that there will be a correlation, within some relatively short, but typically variable, time period, between the stream of events corresponding to users entering their individual workspaces (entrance events) and the same users interacting with their computers (login events). This can help identify the person corresponding to a tag.

In one embodiment, this correlation was generally determined by the RFID-Based Inference Platform by constructing a graph having nodes and edges. Person tags and person identities are the nodes, and the weight of the directed edge from a person tag to one or more unique person identities reflects a strength of the "belief" in the correspondence between the person tag and each particular identity.

In particular, when an entrance event corresponding to a person tag and the login event corresponding to a (possibly different) person happen within a short window of time, the RFID-Based Inference Platform increments a "coincidence count" for the corresponding edge between the person tag and the identity of the login. Note that many (entrance, login) events may happen within the same window, and so the RFID-Based Inference Platform may increment the coincidence counts for multiple edges. The RFID-Based Inference Platform also keeps track of the total number of entrance events for each tag. The ratio of the coincidence counts for a (person tag, identity) pair to the total number of entrance events for the person tag yields the weight for the corresponding directed edge. The highest weight edge emanating from the node corresponding to a person tag would then point to the identity of the corresponding person. Note that the RFID-Based Inference Platform would need to gather a sufficient number of samples to avoid situations where multiple tags point to the same identity with their highest weight edges.

To help scale this algorithm, in various embodiments, the RFID-Based Inference Platform compartmentalizes the entrance and login events based on geographic regions. For example, in a very large enterprise, such as a business with offices in various locations throughout the world, there is little point in mixing up login events that happen in zones associated with one subnet (e.g., Bangalore, India) with entrance events that happen in a geographically distant subnet (e.g., Redmond, Wash.).

2.3.5 Object Interaction:

In another embodiment, the RFID-Based Inference Platform examines events within a particular RFID zones to determine interaction between people and objects. Specifically, in various embodiments, the RFID-Based Inference Platform considers the problem of inferring that an object has been "interacted" with, e.g., picked up or otherwise moved by a person for use in making further inferences regarding the object and/or the person. For example, consider a set of tagged objects in a particular zone. If the environment is stable, the RSSI of the backscatter from the tags as recorded at the reader would also be stable. However, if an object is picked up, this would typically change its distance from and/or its orientation with respect to the RFID reader antenna, thereby causing the RSSI of its tag to change.

In various embodiments, the RFID-Based Inference Platform uses empirical observations to detect a significant change which is sufficient to indicate interaction between a tagged person and a tagged object. For example, in a tested embodiment, the RFID-Based Inference Platform samples the RSSI of each object tag in a particular zone on the order of about every 200 ms. Then, in a sliding window on the order of about 4 seconds and containing on the order of about 20 samples, the RFID-Based Inference Platform determines low and high percentiles of the RSSI. In a tested embodiment, these low and high percentiles of the RSSI were determined at the 10th and 90th percentiles, respectively. Then, if the RSSI in each case were found to differ by an amount on the order of around 10 dBm, the RFID-Based Inference Platform concludes that there has been a significant change in the RSSI and declares that the object has been interacted with. Note that the values listed above are dependent on several factors, including the capabilities of the particular RFID reader being used. Consequently, it should be understood that the values listed above are provided only for purposes of explanation.

Further, as noted above, the RSSI can also change because of the introduction of an obstruction, e.g., the movement of a person. Therefore, in various embodiments, the RFID-Based Inference Platform minimizes spurious detection of interaction because of such events by using multiple antennas, each mounted in a different position and orientation, covering the region of interest. The RFID-Based Inference Platform then requires that each antenna detect a significant change in the RSSI of a tag (based on the thresholds noted above) for it to be deemed as an interaction. In tested embodiments, it has been observed that the probability is low that a non-interaction event would cause the RSSI measured by all antennas to change significantly at the same time. In fact, it has been observed that as few as two antennas is typically sufficient to provide satisfactory results for addressing this issue.

2.4 Improving Reliability:

In various embodiments, the RFID-Based Inference Platform improves the reliability of RFID tag reads by using a simple multi-tagging scheme, where multiple tags are affixed, in preferably different orientations, onto each object. The orientation diversity is not essential, however, it helps to increase the probability of at least one of an object's tags being detected. Note that this type of multi-tagging is known to those skilled in the art for use in improving object detection probabilities for known objects.

However, in the context of the RFID-Based Inference Platform, where tags are automatically identified as either person tags or object tags, without any prior knowledge of what those tags are affixed to, multi-tagging raises the issue of automatically learning which set of tags is attached to the same object. Therefore, to address this issue, the RFID-Based Inference Platform starts with the assumption that all tags belong to one giant super-object, represented as a fully-connected graph over the tags. Then, any time two tags are detected simultaneously in different zones, the RFID-Based Inference Platform automatically concludes that the tags belong to different objects and so deletes the edge between them. In one embodiment, this process is refined by requiring that the different zones are non-adjacent to avoid the issue of overlapping zones discussed above. In either case, after running a large number of tag sighting events through this algorithm, the RFID-Based Inference Platform would be left with a set of connected components, each of which the RFID-Based Inference Platform infers as corresponding to the set of tags attached to the same object.

2.5 Ensuring Privacy:

As noted above, the enterprise is assumed to be trusted and/or secure, while individuals are not necessarily trusted. Consequently, in various embodiments, the RFID-Based Inference Platform does not worry about defending against privacy attacks by the enterprise itself, which is after all the entity that would deploy and manage any system which implemented any of the various embodiments of the RFID-Based Inference Platform. Therefore, assuming entries-based deployment, in various embodiments, the RFID-Based Inference Platform focuses on attempts to compromise privacy by surreptitiously monitoring RFID tags, such as through the use of rogue RFID readers.

In particular, in order to address such threats, in various embodiments, the RFID-Based Inference Platform use a simple relabeling technique where the ID (e.g., EPC code) on each tag is rewritten by the RFID-Based Inference Platform infrastructure (via the RFID reader) at random times, thereby defeating attempts by an attacker to track specific tags. Note that many conventional RFID readers are capable of rewriting the IDs of certain types of RFID tags. Thus, this embodiment assumes the availability of RFID readers with tag rewriting capabilities in combination with rewritable tags. Further, rather than performing this rewriting process only once, the RFID-Based Inference Platform performs the ID rewriting as a periodic process at any desired regular or random intervals. Thus, only the infrastructure of the RFID-Based Inference Platform would be aware of the mapping between the old and new tag IDs.

Clearly, as is known to those skilled in the art, other RFID-based privacy issues may exist. For example, the unique identifier (e.g., EPC) carried by RFID tags coupled with the non-line-of-sight operation of RFID implies the ability to "see" and track objects far beyond what the human eye can do. For instance, an RFID reader can easily detect and identify objects that are inside a bag, with privacy implications as well as security implications (e.g., a thief can tell exactly which bags contain valuable items). Further, a person and their possessions can be scanned repeatedly without them realizing it because of non-line-of-sight operation. There are a number of conventional techniques for addressing such privacy concerns, as summarized below, any of which can be used individually or in combination to address such privacy concerns, if desired.

For example, it is possible to "kill" many conventional RFID tags, thereby rendering such tags unreadable. Killing a tag is generally accomplished by issuing a special reader command along with a password. While this might be suitable in some settings (e.g., consumers getting the tags on their purchases killed), this may not be applicable in settings where the ability to track objects in normal course is desired.

Another approach, as noted above, involves renaming tags rather than killing those tags. In particular, rather than being killed, tags could be renamed, perhaps repeatedly, to defeat attempts to track them surreptitiously. One possibility is for the reader to relabel tags. An alternative approach is for a tag to maintain multiple pseudonyms known only to legitimate readers and to cycle through them when queried. Of course, this would requires more advanced tags that are generally more expensive.

Yet another approach involves the use of "proxying." In particular, users can carry their own privacy enforcing guardian devices for RFID, such as a device integrated with a mobile phone, for example, that acts like a personal RFID firewall and intermediates all reader requests to their tags. Then, if the RFID reader is not authorized, the guardian device will prevent the tag from responding to the rogue RFID reader.

Finally, yet another approach involves distance estimation. In particular, some tags may be able to estimate their distance from the reader, such as by evaluating the signal-to-noise ratio of the reader's signal. Then, if the tag determines that the RFID reader is outside of some predetermined "safe" distance, the tag will assume the reader to be a rogue RFID reader and will not respond to the read request.

2.6 Programming Model:

Many applications can be built by leveraging the inferences produced by the RFID-Based Inference Platform. The following paragraphs describe various embodiments of a simple programming model provided by the RFID-Based Inference Platform for building such applications. As noted above, in various embodiments of the aforementioned API, the RFID-Based Inference Platform exposes a set of events (callbacks), which an application can subscribe to, and a set of lookup functions, which an application can call to get information from the processed inference database. Note that while other naming conventions can e used, if desired, in a tested embodiment, the RFID-Based Inference Platform APIs refer to a each tag by its unique tag ID, which corresponds to the unique EPC for each tag.

2.6.1 Events:

In various tested embodiments, the RFID-Based Inference Platform provides the several "events" to which applications can subscribe (see the "database callbacks" shown as element 160 in FIG. 1), including:
1. InterZoneMovementEvent: This event includes the following variables, (tagID, start_Zone, end_Zone, Time), and is raised whenever a tag moves across zones, as discussed above.

2. ObjectInteractedEvent: This event includes the following variables (tagID, Zone, Time), and is raised when a person (i.e., a "person tag") interacts with a tagged object, as discussed above.

2.6.2 APIs:

In various embodiments the RFID-Based Inference Platform exposes several APIs, including the following APIs (note that the API names shown are provided only for purposes of explanation):

1. GetTagList ( ): Returns all the tagIDs in the system
2. GetPersonTags ( ): Returns all the person tagIDs in the system.
3. GetOwnedObjects (tagID): Returns all the object tagIDs associated with the specified person tag.
4. GetTagType (tagID): Returns the type of a tag, i.e., person or object.
5. GetTagOwner (tagID): Returns the owner of the specified object tag.
6. GetPersonTagIdentity (tagID): Returns the user name corresponding to the specified person tag.
7. GetZoneType (Zone): Returns the type of a zone, i.e., private, shared, reserved, public, etc.
8. GetTagsInZone (Zone): Returns the list of tags currently present in the specified zone.
9. GetTagWorkSpaceZone (tagID): Returns the set of zones identified as the workspace of the specified person tagID.
10. GetCurrentTagZone (tagID): Returns the zone that a tag is currently in.

Returns "unknown" if the tag is currently not found by any of the Rfid readers connected to the RFID-Based Inference Platform.

11. GetCalendarEntry (ID, Time): ID can be a person ID or a conference room ID. It returns appointment information for a give time in a person's or conference room's calendar.
12. SetCalendarEntry (ID, StartTime, EndTime, Location): This API is used to automatically add an appointment in the calendar corresponding to the ID (user or conference room) for the specified time and location.

2.7 Applications:

The following paragraphs describe a few of the many applications that can be implemented using various combinations of the events and APIs described above in Section 2.6. Note that the following list is not intended to be an exhaustive list of the possible uses for the RFID-Based Inference Platform, and that there are a very large variety of possible uses for the RFID-Based Inference Platform based on the events and API's described above for interacting with the processed inference database.

2.7.1 Misplaced Object Alert:

The "misplaced object alert" is one example of a service provided by the RFID-Based Inference Platform via inferences derived through tracking the movement of users and objects. In general, the RFID-Based Inference Platform notifies a user when it determines that he/she may have misplaced an object. More specifically, the RFID-Based Inference Platform assumes that an object is misplaced when it is in a shared workspace or a public area, and the object's owner, who was also in the same zone, moves away to a different zone. When such a situation is detected, the system suspects that the object may have been misplaced and alerts the user via any of email, phone, intercom, text message, etc.

To implement this service, the RFID-Based Inference Platform first invokes GetTagList ( ) to learn of all the tags in the system. The RFID-Based Inference Platform then invokes GetTagType ( ) on each tag to learn whether it corresponds to a person or an object. For the object tags alone, the RFID-Based Inference Platform invokes GetTagOwner ( ) to learn the tagID of its owner. Finally, the RFID-Based Inference Platform registers for the InterZoneMovementEvent callback on all person tags. Armed with the ownership and movement information, the RFID-Based Inference Platform is a position to detect whether an object is misplaced, as noted above. If it is, the RFID-Based Inference Platform invokes GetPersonTagIdentity ( ) on the affected persons tagID to learn the identity of the corresponding person, after which the RFID-Based Inference Platforms simply alerts that person to the present location of the misplaced object.

Clearly, any of a number of variants can be defined for the misplaced object alert service. For example, in one embodiment, the RFID-Based Inference Platform requires a minimum separation in terms of time or distance between an object and its owner, for the object to be deemed as having been misplaced.

Further, in another embodiment using the same set of events and APIs as above, a user interface is provided that allows the user to enter plain language queries to query the system for information about the objects he/she owns. For example, the user can ask the RFID-Based Inference Platform: "When was the object I had with me around 4:30 PM last detected?" The RFID-Based Inference Platform will then return the time of last detection along with the location of the last detection. Note that since the process is based entirely on tags, there is no requirement for the RFID-Based Inference Platform to have any knowledge whatsoever of what the tag is actually attached to (whether it is a cell phone, a camera, a water bottle, a set of keys, etc.).

2.7.2 Annotated Video:

As noted above, video sequences can be annotated or indexed using inferences generated by the RFID-Based Inference Platform. For example, in one embodiment, the RFID-Based Inference Platform provides an application that annotates the video feed from a camera with RFID events corresponding to inter-zone movement and object interaction. Such annotations allow user queries via a user interface to search for events of interest. For example, the automated video annotation application enabled by the RFID-Based Inference Platform can automatically answer queries such as "show me all video frames where person A interacted with object X."

In particular, to annotate a video with events, the RFID-Based Inference Platform stores the video in some desired video format, as an AVI or MPEG file, for example. Separately, the RFID-Based Inference Platform records an event log that is temporally correlated with the video but is separate from it. Besides the time of occurrence, an event also records the tagID involved and the zone where the event took place. To support rich querying, in various embodiments, the RFID-Based Inference Platform also stores additional information regarding each event obtained from invocations of GetTagType ( ), GetTagOwner ( ), and GetPersonTagIdentity ( ), as appropriate. Then, when a query is issued for a specific event, the RFID-Based Inference Platform simply extracts the corresponding time offset from the event log and seeks directly to the corresponding point in the video.

Note that in a related embodiment, the user can specify some time period prior to the event and following the event in order to bracket the event of interest. For example, the user can specify a five-minute window (or any other desired time) on either side the event of interest so that the RFID-Based Inference Platform will return a 10-minute segment of the video stream to the user.

One clear use for such an annotated video solution is annotating the video recorded by the security cameras in a building. For example, using the annotated video application described above, a user who is searching for an untagged object that he/she has misplaced could, for instance, query for all sections of the video recording corresponding to when he/she was in the zone of interest. Note that a further example of an automated video annotation application is discussed in Section 4 with reference to FIG. 4.

2.7.3 Automatic Conference Room Booking:

In one embodiment, the RFID-Based Inference Platform provides an application that automatically identifies a shared space as a reserved space (e.g., a conference room) using user calendar information, as described above. While reserving such a room may be the norm, people may sometimes occupy it without reservation, such as in the case where the room is not already occupied and they are simply looking for space to hold an unplanned, last-minute meeting. Despite this barging in, if the room has in fact not been reserved for the time in question, it would be desirable to automatically reserve it for the group that has barged in. This automatic reservation would then avoid the possibility of someone else trying to reserve the apparently free, but in fact occupied, room.

Therefore, in order to address this issue, the RFID-Based Inference Platform provides an application for automatic conference room booking. In particular, from the RFID-Based Inference Platform's zone identification procedure described above, the RFID-Based Inference Platform first recognizes that the room in question is a "reserved space." The RFID-Based Inference Platform then invokes GetTagsInZone ( ) to detect all the tags in the current zone. Invocations of GetTagType ( ) on each such tag then identifies the people, if any, present in the room.

If the RFID-Based Inference Platform finds a group of people staying in the room for longer than some user adjustable or fixed period of time, such as 5 minutes, for example, the RFID-Based Inference Platform assumes that those people are meeting in the room. In this case, the RFID-Based Inference Platform, invokes GetCalendarEntry ( ) on the room to see if there is a reservation for the current time. (Note that it is common practice to treat reserved rooms as "persons," with their own calendars.) If there is no current reservation, the RFID-Based Inference Platform creates an automatic reservation by invoking SetCalendarEntry ( ) for the room and each person in the meeting.

2.7.4 Semi-Automated Image Catalog:

In another embodiment, the RFID-Based Inference Platform provides a semi-automated image cataloging application that allows a user to add photographs of particular tagged objects to the RFID/event database (or some separate database linked to the RFID object database).

In particular, this semi-automated image cataloging application allows the user to pick up a tagged object, hold it in front of their computer/network connected camera, and take a picture. By looking for ObjectInteractedEvent ( ) events in the zone that the user is currently in, the RFID-Based Inference Platform can automatically identify the tagID of the object that was picked up. Note that if the RFID-Based Inference Platform finds that more than one object was interacted with at the time in question, the user can be alerted to repeat the process, if they so desire. The tagID associated with the object that was interacted with is then cataloged along with the picture that was just taken.

A catalog such as this allows users to identify their objects more naturally using images rather than tagIDs. For example, a user could browse the image catalog an select any one or more of the images, at which time the RFID-Based Inference Platform would automatically return information for each selected image, such as, for example, where that object is, or when that object was last in the same zone as the user.

Figure 3:
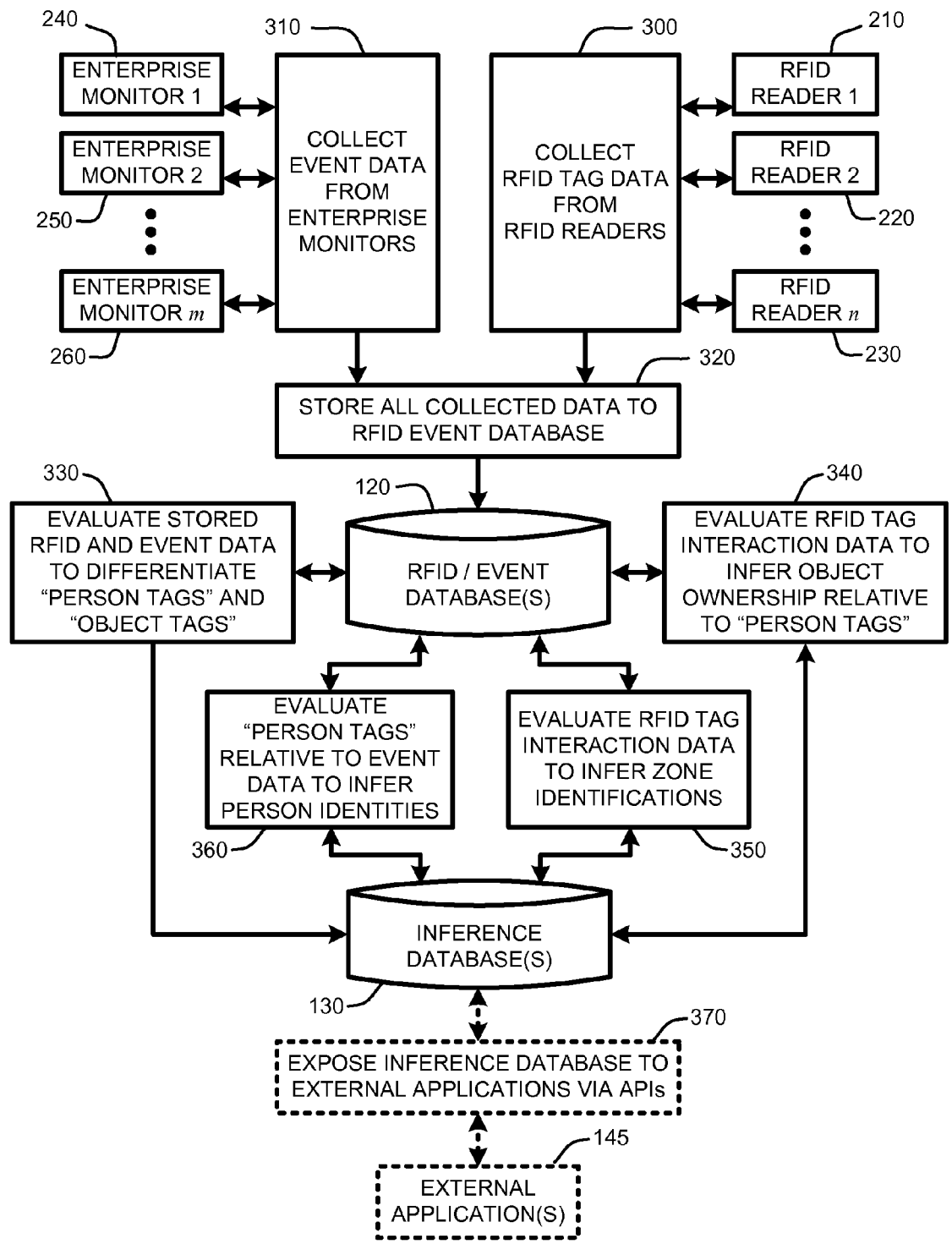
FIG. 3 provides general system flow diagram that illustrates exemplary methods for implementing various embodiments of the RFID-Based Inference Platform, as described herein.

3.0 Operational Summary of the RFID-Based Inference Platform:

The processes described above with respect to FIG. 1 and FIG. 2, and in further view of the detailed description provided above in Section 1 and Section 2 are summarized by the general operational flow diagram of FIG. 3. In particular, FIG. 3 provides an exemplary operational flow diagram that illustrates operation of some of the various embodiments of the RFID-Based Inference Platform described above. Note that FIG. 3 is not intended to be an exhaustive representation of all of the various embodiments of the RFID-Based Inference Platform described herein, and that the embodiments represented in FIG. 3 are provided only for purposes of explanation.

Further, it should be noted that any boxes and interconnections between boxes that may be represented by broken or dashed lines in FIG. 3 represent optional or alternate embodiments of the RFID-Based Inference Platform described herein, and that any or all of these optional or alternate embodiments, as described below, may be used in combination with other alternate embodiments that are described throughout this document.

In general, as illustrated by FIG. 3, the RFID-Based Inference Platform begins operation by collecting 300 RFID tag data from a plurality of RFID readers 210, 220, and 230 spread throughout the workspace being covered by the RFID-Based Inference Platform. As discussed above, one or more RFID tags are affixed to people and objects within the workspace. In the case of people, it is not necessary to actually affix the RFID tags to the people, though this can be done if desired. Instead, RFID tags associated with people are generally affixed to some object that is nearly always carried by the person, such as an employee badge or other object.

In addition to collecting 300 the RFID tag data, the RFID-Based Inference Platform also collects 310 event data from a plurality of various types of enterprise monitors 240, 250 and 260. As discussed above, examples of some of the various types of enterprise monitors include, but are not limited to, electronic calendar systems, user presence systems, security cameras, WiFi networks, cardkey access systems, etc. Further, all of the collected RFID data and event data is time-stamped, generally by the device collecting that information (i.e., RFID readers or enterprise monitors).

All of the RFID tag data and enterprise monitor event data collected (300 and 310) are stored 320 to the aforementioned RFID/event database 120 as it is collected. Consequently, the RFID/event database 120 is expected to grow over time. Further, since the RFID/event database 120 grows over time, it should also be expected that any inferences drawn from the RFID/event database will evolve over time, as those inferences are periodically updated as the RFID/event database continues to receive information. Note that in various embodiments, to prevent unconstrained growth of the RFID/event database, data associated with tags that have not been observed for some extended time period can be pruned from the database, if desired.

In any case, given the information contained in the RFID/event database 120, the RFID-Based Inference Platform evaluates that data to infer a number of informational details that are used to populate the aforementioned inference database 130. For example, in various embodiments, the RFID-Based Inference Platform makes some or all of the following inferences for inclusion in the inference database 130:

1. Tag Type Differentiation: The RFID-Based Inference Platform evaluates 330 the stored RFID and event data to infer a differentiation of tags into a discrete set of "person tags" and a discrete set of "object tags."
2. Tag Ownership: The RFID-Based Inference Platform evaluates 340 RFID tag interaction data derived from an analysis of co-movement and co-location data of object tags and person tags contained in the RFID/Event database 120 to infer ownership of particular object tags relative to particular person tags.
3. Zone Type Identification: The RFID-Based Inference Platform evaluates 350 RFID tag interaction data, including RFID tag movements, RFID tag co-movement, and RFID tag co-location data contained in the RFID/Event database 120 to infer zone identifications (i.e., the type of zone, such as individual workspaces, shared workspaces, reserved shared workspaces, common areas, etc.). Note that this list of workspaces is specific to an enterprise environment such as a large business, and that other types of workspaces can be specified for other environments, such as schools, private homes, public locations, hospitals, etc.
4. Person Tag Identification: The RFID-Based Inference Platform evaluates 360 "person tags" relative to event data in the RFID/event database 120 to infer specific identities to associate with one or more of those person tags. For example, a known person tag is always co-located with a computer login event for the same individual, the RFID-Based Inference Platform will generally infer that the identity of the person associated with that person tag is the same as the person logging into the computer.

Clearly, any of a number of inferences can be made depending upon the specifics of the enterprise monitor set available for use in capturing and collecting event data that can be temporally correlated with the RFID tag data. Consequently, the aforementioned basic types of inferences should be understood to represent an exemplary list of inferences that is not exhaustive. The basic idea here is that RFID tag data can be combined with data from other sensors, monitors, and/or services in order to infer relationships from RFID tag interaction with those events and with other RFID tags in order to infer additional information that can then be exposed 370 to external applications.

Figure 4:
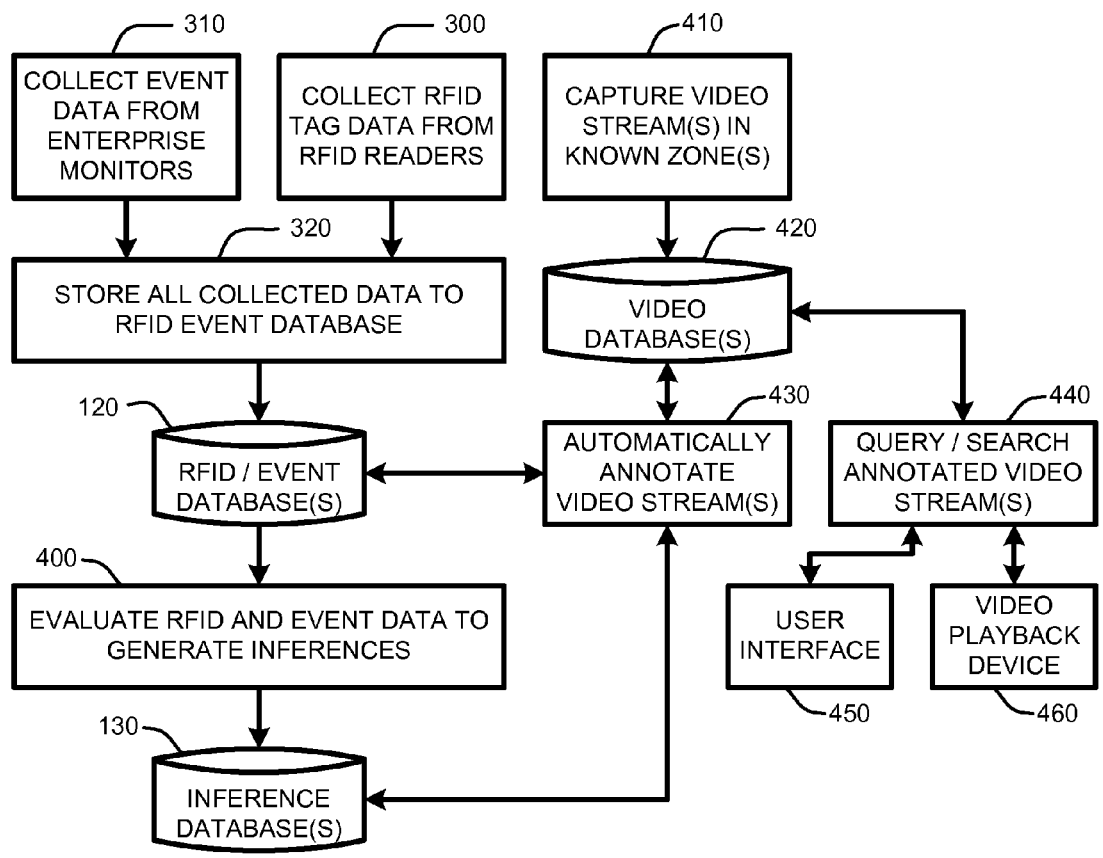
FIG. 4 provides general system flow diagram that illustrates exemplary methods for implementing an automated video annotation application using various embodiments of the RFID-Based Inference Platform, as described herein.

In particular, as noted above, in various embodiments the RFID-Based Inference Platform provides a set of APIs or the like (see Section 2.6.2 for examples of various APIs) that expose 370 the inference database 130 to one or more external applications 145. Various examples of such external applications 145 include, but are not limited to:
1. Automated object tracking;
2. Automated object cataloging;
3. Automated misplaced object alerts;
4. Automated video annotations;
5. Annotated video queries;
6. Automated conference room scheduling;
7. Semi-automated object image catalogs;
8. Object ownership queries;
9. Object interaction queries;
10. Object and/or Person location queries;
11. Person interaction queries;
12. Automated object-based security alerts (i.e., object not where it is expected or co-located with an unexpected person or object); and
13. Automated person-based security alerts (i.e., person not where they are expected or co-located with an unexpected person or object);

4.0 Video Annotation Application Example:

As discussed above in section 2.7.2, in various embodiments, the RFID-Based Inference Platform provides automated video annotation based on the information in the RFID/event database and inferences derived from that data. FIG. 4 provides a general system flow diagram that illustrates exemplary methods for implementing an automated video annotation application using various embodiments of the RFID-Based Inference Platform.

In general, FIG. 4 generally builds off the basic RFID-Based Inference Platform shown in FIG. 3 by illustrating the inclusion of a video stream that is captured, saved, and then automatically annotated or indexed using information from the RFID/event database and the inference database.

More specifically, as discussed with respect to FIG. 3, FIG. 4 shows that the RFID-Based Inference Platform collects 300 time-stamped RFID tag data from the RFID readers, and further collects 310 time-stamped event data from the various enterprise monitors. This collected data is then stored to the RFID/event database 120. Data stored in the RFID/event database is periodically evaluated 400 to make inferences regarding the type of tags (person or object), ownership of tags, identification of zone types, and identity corresponding to person tags. All inferences are stored to the inference database 130. To this point, the processes illustrated in FIG. 4 are simply a summary of the processes described with respect to FIG. 3.

However, unlike FIG. 3, the general system flow diagram of FIG. 4 includes a process for capturing 410 one or more video streams in known zones. As with the RFID tag data and event data, the captured video streams are time-stamped. The captured video streams are then stored to a video database 420. Alternately, captured video streams can be stored to the RFID/event database 120 as just another stream of event data captured from an enterprise monitor (which in this case is a video camera). In either case, the RFID-Based Inference Platform then automatically annotates 440 or indexes the video stream using information from either or both the RFID/event database 120 and the inference database 130.

For example, in various embodiments, annotations may include information such as RFID events corresponding to inter-zone movement and object interaction. Such annotations allow user queries or search 450 via a user interface 460 to search for events of interest. For example, as noted above, the automated video annotation application enabled by the RFID-Based Inference Platform can automatically answer various queries, including:
1. In an object tracking context, "Show me all video frames where person A interacted with object X in any zone."
2. In an object security context, "Show me all video frames from all zones for a two minute period surrounding each video frame in which object X showed any inter-zone movement."
3. In a person tracking context, "Show me the most recent video frames from any zone that show person B."
4. In a safety context, "Show me all video frames in zone Z beginning 5 minutes prior to triggering of the smoke detector in zone Z."

The above examples are only a few of the many queries that are possible given various combinations of the API's described in Section 2.6.2. In fact, it should be clear that given the described set of APIs, many rich queries regarding annotated video streams are possible.

Finally, in response to the query, the RFID-Based Inference Platform simply displays the video frames resulting from the query using a conventional video playback device 470. In related embodiments, the user interface 460 allows the user to interact with the annotated video returned in response to the query 450, such as by printing one or more frames, exporting one or video frames or sequences of video frames for later use, performing facial recognition of persons in video frames of interest, etc.

Figure 5:
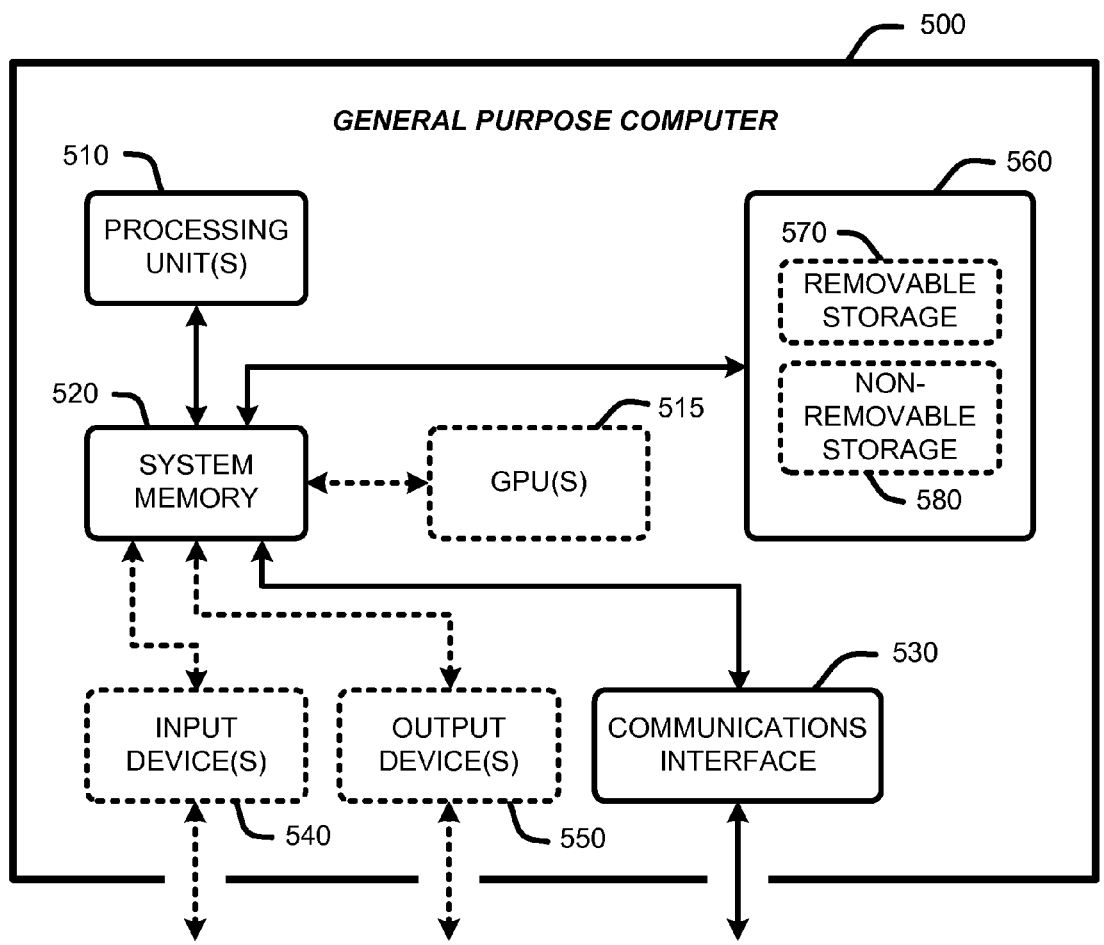
FIG. 5 is a general system diagram depicting a simplified general-purpose computing device having simplified computing and I/O capabilities for use in implementing various embodiments of the RFID-Based Inference Platform, as described herein.

5.0 Exemplary Operating Environments:

The RFID-Based Inference Platform is operational within numerous types of general purpose or special purpose computing system environments or configurations. FIG. 5 illustrates a simplified example of a general-purpose computer system on which various embodiments and elements of the RFID-Based Inference Platform, as described herein, may be implemented. It should be noted that any boxes that are represented by broken or dashed lines in FIG. 5 represent alternate embodiments of the simplified computing device, and that any or all of these alternate embodiments, as described below, may be used in combination with other alternate embodiments that are described throughout this document.

For example, FIG. 5 shows a general system diagram showing a simplified computing device. Such computing devices can be typically be found in devices having at least some minimum computational capability, including, but not limited to, personal computers, server computers, hand-held computing devices, laptop or mobile computers, communications devices such as cell phones and PDA's, multiprocessor systems, microprocessor-based systems, set top boxes, programmable consumer electronics, network PCs, minicomputers, mainframe computers, video media players, etc.

At a minimum, to allow a device to implement the RFID-Based Inference Platform, the device must have some minimum computational capability along with a network connection or other data connection or input device for receiving RFID event data and other sensor or system data, and either storage capability for storing RFID and sensor event data and inferences or a data output device for external storage of data and inferences.

In particular, as illustrated by FIG. 5, the computational capability is generally illustrated by one or more processing unit(s) 510, and may also include one or more GPUs 515. Note that that the processing unit(s) 510 of the general computing device of may be specialized microprocessors, such as a DSP, a VLIW, or other micro-controller, or can be conventional CPUs having one or more processing cores, including specialized GPU-based cores in a multi-core CPU.

In addition, the simplified computing device of FIG. 5 may also include other components, such as, for example, a communications interface 530. The simplified computing device of FIG. 5 may also include one or more conventional computer input devices 540. The simplified computing device of FIG. 5 may also include other optional components, such as, for example, one or more conventional computer output devices 550. Finally, the simplified computing device of FIG. 5 may also include storage 560 that is either removable 570 and/or non-removable 580. Note that typical communications interfaces 530, input devices 540, output devices 550, and storage devices 560 for general-purpose computers are well known to those skilled in the art, and will not be described in detail herein.

The foregoing description of the RFID-Based Inference Platform has been presented for the purposes of illustration and description. It is not intended to be exhaustive or to limit the claimed subject matter to the precise form disclosed. Many modifications and variations are possible in light of the above teaching. Further, it should be noted that any or all of the aforementioned alternate embodiments may be used in any combination desired to form additional hybrid embodiments of the RFID-Based Inference Platform. It is intended that the scope of the invention be limited not by this detailed description, but rather by the claims appended hereto.

What is claimed is:

1. A method for automatically inferring correlations between entities having RFID tags, comprising steps for:
   repeatedly scanning a location having one or more zones of interest using one or more RFID tag readers;
   storing all RFID tag data captured by any of the RFID tag readers to a computer readable storage medium;
   repeatedly evaluating the stored RFID tag data, including co-location of RFID tags within particular zones, to infer correspondences between two or more RFID tags;
   repeatedly evaluating the stored RFID tag data, including RFID tag movement and RFID tag co-movement between two or more zones, to infer relationships between RFID tags; and
   repeatedly evaluating the RFID tag correspondences and relationships to infer a type of RFID tag, including which of the RFID tags represent people ("person tags"), and which of the RFID tags represent objects ("object tags").

2. The method of claim 1 further comprising steps for inferring a zone type for each zone from a set of predefined zone types by repeatedly evaluating the RFID tag correspondences, relationships and types.

3. The method of claim 1 further comprising steps for inferring an association between one or more specific object tags and one or more specific person tags by repeatedly evaluating the RFID tag correspondences, relationships and types.

4. The method of claim 3 further comprising steps for providing an automated misplaced object alert to a person linked with a particular person tag when one or more of the RFID readers receives RFID tag data from one of the object tags, having an inferred association by that person tag, in a zone different from the zone in which one or more other RFID readers receives RFID tag data from that person tag.

5. The method of claim 1 wherein inferring correspondences between two or more RFID tags further includes repeatedly evaluating RFID tag interactions within a particular zone.

6. The method of claim 5 further comprising correlating event data to the RFID tag data within each zone based on time-stamps associated with the event data, time-stamps associated with the RFID tag data, and any inferences made from the event data and RFID tag data.

7. The method claim 6 further comprising automatically inferring an identity of persons associated with one or more of the person tags by evaluating the correlated event data and RFID data to associate identity information from one or more elements of the event data to particular person tags.

8. The method of claim 1 further comprising steps for:
   storing all inferences to an inference database; and
   providing a set of APIs for allowing one or more external programs to directly interact with the inference database.

9. A computer-readable storage device having computer-executable instructions stored thereon for inferring correlations between entities associated with random RFID tags, said instructions comprising:
   automatically collecting RFID tag data captured by repeated scans of the RFID tags in one or more zones of interest;
   automatically inferring correlations between tagged entities, by evaluating RFID tag data selected from a group comprising one or more of RFID tag co-location in one or more of the zones, RFID tag interaction within a particular zone, and RFID tag co-movement between two or more zones; and repeatedly evaluating the collected RFID tag data and inferred correlations for automatically inferring which of the entities are persons and which of the entities are objects.

10. The computer-readable storage device of claim 9 for automatically inferring zone type for each zone from a set of predefined zone types by repeatedly evaluating the inferred correlations.

11. The computer-readable storage device of claim 9 further comprising instructions for automatically inferring associations between one or more of the entities based on event data collected from a plurality of sensors, services and monitors within any of the zones of interest in combination with the inferred correlations and inference of which of the entities are persons and which of the entities are objects.

12. The computer-readable storage device of claim 11 further comprising instructions for:

storing all inferences to an inference database; and
providing a set of APIs for allowing one or more external applications to directly interact with the inference database.

13. The computer-readable storage device of claim 12 wherein the external applications include one or more of a group comprising:
an automated object tracking application;
an automated object cataloging application;
an automated misplaced object alert application;
an automated multimedia indexing application;
an annotated video query application;
an automated conference room scheduling application;
a semi-automated object image cataloging application;
an object ownership query application;
an object interaction query application;
an object location query application;
a person location query application;
a person interaction query application;
an automated object-based security alert application; and
an automated person-based security alert application.

14. The computer-readable storage device of claim 9 further comprising instructions for associating a specific identity of one or more persons with one or more of the random RFID tags.

* * * * *